(12) United States Patent
Holmes

(10) Patent No.: US 12,048,063 B2
(45) Date of Patent: Jul. 23, 2024

(54) AUTOMATED SUBSCRIPTION MANAGEMENT FOR WIRELESS DEVICES HAVING MULTIPLE SUBSCRIPTION PROFILES

(71) Applicant: T-Mobile Innovations LLC, Overland Park, KS (US)

(72) Inventor: David William James Holmes, Sammamish, WA (US)

(73) Assignee: T-Mobile Innovations LLC

( * ) Notice: Subject to any disclaimer, the term of this patent is extended or adjusted under 35 U.S.C. 154(b) by 222 days.

(21) Appl. No.: 17/536,873

(22) Filed: Nov. 29, 2021

(65) Prior Publication Data
US 2023/0171586 A1    Jun. 1, 2023

(51) Int. Cl.
*H04W 8/18*    (2009.01)
*H04W 12/06*    (2021.01)
*H04W 48/16*    (2009.01)
*H04W 60/00*    (2009.01)
*H04W 64/00*    (2009.01)

(52) U.S. Cl.
CPC ........... *H04W 8/186* (2013.01); *H04W 8/183* (2013.01); *H04W 12/06* (2013.01); *H04W 60/005* (2013.01); *H04W 64/00* (2013.01)

(58) Field of Classification Search
None
See application file for complete search history.

(56) References Cited

U.S. PATENT DOCUMENTS

2020/0154263 A1 * 5/2020 Guday ................. H04W 8/183

FOREIGN PATENT DOCUMENTS

WO    WO-2023075655 A1 *  5/2023

* cited by examiner

*Primary Examiner* — Gary Lafontant

(57) ABSTRACT

A method comprises detecting, by a subscription management application of the coordinator device, a trigger event that triggers wireless devices in a cluster to activate a subscription profile, determining, by the subscription management application, at least one of coordinator location data describing a location of the coordinator device or coordinator network data describing a network characteristic of a network accessed by the coordinator device, receiving, by the subscription management application, at least one of companion location data describing a location of the companion device or companion network data describing a network characteristic of a network accessed by the companion device, and determining, by the subscription management application, the subscription profile based on at least one of the coordinator location data, the coordinator network data, the companion location data, or the companion network data.

18 Claims, 10 Drawing Sheets

AUTOMATED SUBSCRIPTION MANAGEMENT FOR WIRELESS DEVICES HAVING MULTIPLE SUBSCRIPTION PROFILES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may complete an authentication process with a cell site to obtain a wireless communication link from the cell site and access to the radio access network (RAN) that the cell site is a part of. This may involve the mobile communication device radio modem obtaining network access keys or network access credentials from a subscriber identity module (SIM) and providing those network access keys or network access credentials to the cell site. The SIM may be a fixed or removable SIM card, or an electronic SIM (eSIM) profile included in an embedded universal integrated circuit card (eUICC). A SIM card may include a processor and a memory storing network access keys and/or network access credentials. The eSIM profile may be provisioned with the network access keys and/or network access credentials, branding information, applications, and other data artifacts.

To change service providers in a device using a SIM card, a user may remove the SIM card from the device and replace the SIM card with another one. To change service providers in the device using one or more eSIM profiles, the radio modem may first obtain the network access keys or network access credentials from the eUICC. The radio modem may then provide those network access keys or network access credentials to a cell site, to obtain a wireless communication link to a RAN associated with a different service provider.

SUMMARY

In an embodiment, a method is disclosed. The method is implemented by a cluster of wireless devices comprising a coordinator device and a companion device communicatively coupled to the coordinator device. The method comprises detecting, by a first subscription management application of the coordinator device, a trigger event that triggers one or more wireless devices in the cluster to activate a subscription profile, wherein the subscription profile is associated with a Subscriber Identity Module (SIM) card or an electronic Subscriber Identity Module (eSIM) profile, transmitting, by the first subscription management application, at least one of coordinator location data describing a location of the coordinator device or coordinator network data describing a network characteristic of a radio access network (RAN) accessed by the coordinator device, receiving, by the first subscription management application, at least one of companion location data describing a location of the companion device or companion network data describing a network characteristic of a RAN accessed by the companion device, activating, by the first subscription management application, the subscription profile at the coordinator device, receiving, by a second subscription management application of the companion device, at least one of the coordinator location data or the coordinator network data, transmitting, by the second subscription management application, at least one of the companion location data or the companion network data, and activating, by the second subscription management application, the subscription profile at the companion device.

In another embodiment, a method for managing subscriptions across a cluster of wireless devices comprising a coordinator device and one or more companion devices is disclosed. The method comprises detecting, by a subscription management application of the coordinator device, a trigger event that triggers one or more wireless devices in the cluster to activate a subscription profile, wherein the subscription profile is associated with an electronic Subscriber Identity Module (eSIM) profile, determining, by the subscription management application, at least one of coordinator location data describing a location of the coordinator device or coordinator network data describing a network characteristic of a radio access network (RAN) accessed by the coordinator device, receiving, by the subscription management application, at least one of companion location data describing a location of the companion device or companion network data describing a network characteristic of a RAN accessed by the companion device, determining, by the subscription management application, the subscription profile based on at least one of the coordinator location data, the coordinator network data, the companion location data, or the companion network data, receiving, from the companion device, an indication that the subscription profile is not present at the companion device, and transmitting, to the companion device, a message comprising a link to the subscription profile, wherein the link is used to retrieve and install the subscription profile.

In yet another embodiment, a system is disclosed. The system includes a cluster of wireless devices, comprising a coordinator device, and one or more companion devices coupled to the coordinator device. The coordinator device comprises one or more non-transitory memories, one or more processors coupled to the one or more non-transitory memories, a subscription management application stored in one of the one or more non-transitory memories that, when executed by one of the one or more processors, cause the one of the one or more processors to be configured to detect a trigger event that triggers one or more wireless devices in the cluster to activate a subscription profile, wherein the subscription profile is associated with a Subscriber Identity Module (SIM) card or an electronic Subscriber Identity Module (eSIM) profile, wherein the trigger event occurs when at least one of the coordinator device or the companion device changes a location to one served by a different cell site or detects a change in a network performance attribute of a radio access network (RAN), determine at least one of coordinator location data describing a location of the coordinator device or coordinator network data describing a network characteristic of a RAN accessed by the coordinator device, receive at least one of companion location data describing a location of the companion device or companion network data describing a network characteristic of a RAN accessed by the companion device, determine the subscription profile to activate at the companion device based on at least one of the coordinator location data, the coordinator network data, the companion location data, or the companion network data, and transmit, to the companion device, a message comprising a recommendation to activate the subscription profile at the companion device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
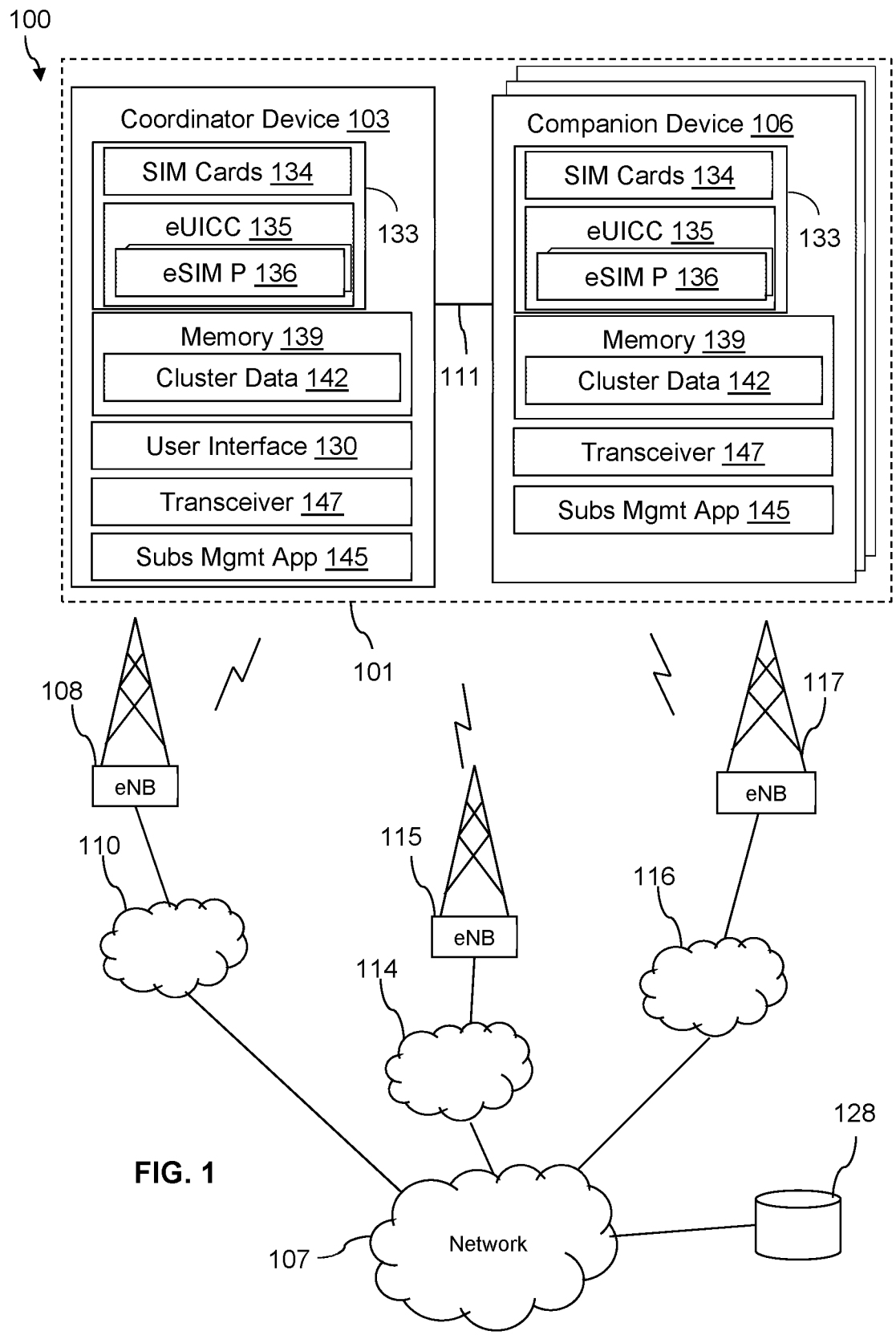
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices may include the fixed removable SIM card in the device or one or more electronic Subscriber Identity Module (eSIM) profiles stored in an embedded universal integrated circuit card (eUICC) of the device. The eUICC may be permanently wired to a motherboard of a device. The eSIM profile comprises wireless communication service provider data and subscriber data, such as network access keys and/or network access credentials. A subscriber profile may refer to either a SIM card or an eSIM profile.

Each subscriber profile may be associated with a different telecommunications service provider or mobile network operator (hereinafter referred to as a "service provider"). Each service provider may be associated with a different cell site and corresponding radio access network (RAN). A device (e.g., a radio modem or transceiver in the device) may perform a lookup on the network access credentials that are part of the subscription profile and present these network access credentials to the RAN (e.g., a cell tower). The RAN may perform subscriber authentication and service access authorization on the device based on the network access credentials received from the device. The RAN may provide access to the device after authentication and authorization based on the network access credentials.

In this way, each eSIM profile or SIM card includes the network access keys or network access credentials used to access the cell site and corresponding RAN of the respective service provider. To change a wireless communication service (i.e., service providers) at the device, a user may manually remove a first SIM card and install a second SIM card. Alternatively, the user may deactivate a first eSIM profile stored in the eUICC of the device and then activate a second eSIM profile also stored in the eUICC of the device. This may be performed manually by the user via a user interface (UI) of the device or automatically using a background application on that device that switches between eSIM profiles according to some preset algorithm based on a location or network performance attribute. The device may be a consumer device, such as a handheld device or medical monitoring device, or an Internet of Things (IoT) device.

However, certain devices carrying multiple subscription profiles may altogether lack the ability to accurately determine or select an optimal subscription profile based on an environment of the device. For example, IoT devices may not include UIs by which a user can select a subscription profile for connecting to the network. Alternately, certain types of medical monitoring devices that automatically upload medical data collected in real time may have limited processing capabilities and may prioritize power conservation. This limits the capabilities of the medical monitoring devices to determine or select an optimal subscription profile. In addition, certain devices may lack auxiliary functions, such as location awareness or a Global Positioning System (GPS) receiver, that may be used to determine the environment of the device for selection of an optimal subscription profile. Nonetheless, devices with varying strengths and processing capabilities may be typically used to individually analyze an environment of the device to select an optimal subscription profile for the device, even though multiple devices may belong to a single user and may be located proximate to one another.

The embodiments disclosed herein seek to resolve the foregoing issues by implementing a system in which multiple wireless devices of a user, which are located proximate to one another, are designated into separate categories and together form a cluster of wireless devices. A single device may be designated as the coordinator device, which acts as the master device in the cluster. The remaining devices in the cluster may be designated as companion devices. The coordinator device may be a device, for example, that has a UI, that has the strongest antenna relative to all the devices in the cluster, that has the best power source (e.g., most battery capacity) relative to all the devices in the cluster, or that is located in an optimal location (e.g., a location with the strongest signal strength) relative to all the devices in the cluster. The companion devices may refer to any or all of the other wireless devices in the cluster. For example, the companion devices may include the IoT devices, medical monitoring devices, and/or wearable devices of the user.

In an embodiment, the coordinator device and the companion devices each may include one or more subscription profiles, including one or more SIM cards and/or one or more eSIM profiles stored in an eUICC. Each of the subscription profiles are associated with a different service provider, and when activated, connect a transceiver (e.g. radio modem) of the device to a cell site of a corresponding RAN operated by the respective service provider. The coordinator device and the companion devices each include a subscription management application that may be used to communicate with one another and switch between subscription profiles based on the communications.

As an illustrative example, a user may travel from the user's standard home location to a vacation home location, which may be in a rural area. The user may travel with multiple devices, including, for example, the user's mobile phone, smart watch, heart monitor, camera, and gaming console. In this example, all of the user's devices may communicate with one another to register itself as members of a cluster of devices belonging to the user and then select the mobile phone as the coordinator device based on information describing the mobile phone. The subscription profiles may include a first subscription profile associated with a first service provider, which may be activated at the user's standard home location. When the user, along with all the user's devices in the cluster, travel to the vacation home, the cell site and RAN corresponding to the first service provider may no longer be available for access to the user's devices. In this way, the user's devices may not be able to access the Internet using the first subscription profile, due to a lack of or weak connection.

In this case, the coordinator device may detect that a trigger event has occurred when, for example, the coordinator device 103 has changed to a location that no longer has connection to the Internet using a currently activated subscription profile. In an embodiment, the coordinator device may determine location data describing a location of the coordinator device or network data describing a network characteristic of a RAN accessed by the coordinator device. For example, the location data may be a GPS location of the coordinator device. The network data may describe whether access to the RAN is available, a strength of connection to the RAN, and other network characteristics (e.g., bandwidth, throughput, latency, jitter, error rate, signal strength, etc.). The network data may also include quality of service (QoS) data indicating a QoS subscribed for in association with the coordinator device 103. For example, the heart rate monitor may be subscribed in association with a minimum throughput (e.g., QoS) when accessing networks serviced by one or more service providers.

In an embodiment, the coordinator device may determine a different subscription profile to activate based on the location data and network data. For example, the coordinator device may use the location data to determine a corresponding subscription profile associated with the location data, which may be stored in a predefined look-up table. As another example, the coordinator device may use the location data to determine (e.g., scan for) other RANs accessible at the location. In an embodiment, the coordinator device may determine whether the coordinator device and one or more of the companion devices have a subscription profile corresponding to one of the RANs accessible at the location. If so, the coordinator device may deactivate a current subscription profile and activate the determined subscription profile. The coordinator device may also transmit a message, to one or more of the companion devices using a secure wireless connection, including a recommendation or instruction indicating that the companion device should activate the determined subscription profile. The companion devices that received the message may deactivate the current subscription profile and activate the determined subscription profile if the subscription profile is present at the companion devices. For example, the companion devices execute the received instruction in a processor of the companion devices and/or in a SIM or eUICC of the companion devices.

When the subscription profile is not present at a companion device, the coordinator device may transmit, in the message, a link or address to a location at which the subscription profile may be downloaded at the companion device. The message may include, for example, a token used to authenticate the companion device when receiving the subscription profile. The subscription profile may be downloaded from a cache at the coordinator device or a location in an external data store.

In an embodiment, the companion devices may also transmit respective location data and network data to the coordinator device prior to the coordinator device determining the subscription profile. In this case, the coordinator device may use the received companion device location data and network data to determine a subscription profile, activate the subscription profile, and transmit the message to one or more of the companion devices.

In some cases, the coordinator device may aggregate all the determined and received location data and network data, to obtain cluster data. The coordinator device may share the cluster data with the companion devices. In an embodiment, each of the companion devices may individually determine a subscription profile to activate based on the received cluster data, instead of waiting for the coordinator device to make the determination.

In an embodiment, the coordinator device may determine that different companion devices should activate different subscription profiles based on the location data received from the companion devices, the network data (e.g., QoS data) received from the companion devices, processing and power capabilities of each of the companion devices, or network performance attributes. For example, the network data received from the heart rate monitor may include QoS data indicating that the heart rate monitor user data should be transmitted through a network with a lower latency and higher throughput due to the prioritized nature of the data being transmitted. In this case, the coordinator device may send a message to the heart rate monitor to activate a subscription profile corresponding to a RAN with a lower latency and higher throughput. Meanwhile, the network data received from the gaming console may include QoS data indicating that the gaming console user data should be transmitted through a network with a higher bandwidth. In this case, the coordinator device may send a message to the gaming console to activate a subscription profile corresponding to a RAN with a higher bandwidth.

In embodiment, the coordinator device may implement load sharing in the process of determining that different companion devices should activate different subscription profiles based on network performance attributes of different accessible networks (e.g., RANs). For example, a first network may have a high latency (e.g., network performance attribute), while a second network may have a high packet loss (e.g., network performance attribute), and while a third network has far better network performance attributes. The coordinator device may obtain these network performance attributes from a node in each network, and determine that the gaming console should activate subscription profile for the first network or second network, while the heart rate monitor should activate the subscription profile for the third network. In this way, the coordinator device may distribute the devices in the cluster between multiple networks based on device information and network performance attributes. In some embodiments, the pathways among the different networks and different devices may be amalgamated together to create a link, for example, using a proxy server, such that traffic can be forwarded through the amalgamated link.

In an embodiment, the cluster of devices may also include one or more peer devices that works with the coordinator device and/or one or more of the companion devices. The peer device may act in companion with or separately from the coordinating device to perform one or more of the steps performed by the coordinating device, as described herein. For example, the peer device may maintain information regarding subscription profiles available at each of the coordinator device and companion devices. In one case, the peer device may receive a collection of location data and network data from the coordinator device after the coordinator device receives and aggregates location data and network data from all of the companion devices. Alternatively, the peer device may receive location data and network data separately from the coordinator device and the companion devices. In either case, the peer device may use the information regarding subscription profiles available, location data, and network data to determine a different subscription profile to activate at the coordinator device and/or the companion devices. The peer device may transmit a recommendation or instruction to activate the determined subscription profile to the coordinator device and/or companion devices. In response to executing the received instruction, the companion devices may change the SIM or eUICC to activate a different subscription profile or eSIM profile.

In an embodiment, the peer device itself may not include any subscription profiles or connection to a network. However, the peer device may include the hardware and software components used to establish the secure connection to the coordinating device and companion devices and perform the steps described above. In an embodiment, the peer device is a device with a display that may be used to present a user interface to the user associated with the cluster of devices. In this case, the user may select one or more subscription profiles to activate at the peer device. The peer device may then transmit a recommendation or instruction to activate the determined subscription profile to the coordinator device and/or companion devices. In response to executing the received instruction, the companion devices may change the SIM or eUICC to activate a different subscription profile or eSIM profile.

Therefore, the embodiments disclosed herein enable different user devices to automatically activate a subscription profile across all devices on an as needed basis based on determinations made at the coordinator device and/or companion device, rather than each of the devices individually determining a subscription profile based on isolated factors. This in turn conserves CPU resources and power resources at the companion devices. In addition, the embodiments used herein enable a more efficient and accurate use of network resources in the transmission of user data through different networks.

Turning now to FIG. 1, a system 100 is described. In an embodiment, the system 100 comprises a cluster 101 of wireless devices, cell site 108 and corresponding service provider/mobile network operator RAN 110, cell site 115 and corresponding RAN 114, cell site 117 and corresponding RAN 116, network 107, and data store 128. The cluster 101 includes a coordinator device 103 and one or more companion devices 106, all of which may be owned and operated by a single entity or user.

As mentioned above, the cell sites 108, 115, and 117, which respectively correspond to the RANs 110, 114, and 116, may each be associated with a different service provider. For example, cell site 108 and RAN 110 may be associated with T-Mobile®, cell site 115 and RAN 114 may be associated with another service provider, and cell site 117 and RAN 116 may be associated with yet another service provider. One or more of the cell sites 108, 115, and 117 and RANs 110, 114, and 116, respectively, may provide the coordinator device 103 and the companion devices 106 with a wireless communication link to the network 107 according to a 5G, a long term evolution (LTE), a code division multiple access (CDMA), or a global system for mobile communications (GSM) wireless telecommunication protocol. In this way, the coordinator device 103 and the companion devices 106 may be communicatively coupled to the network 107, or the Internet, via the cell sites 108, 115, and 117 and RANs 110, 114, and 116, respectively. While the RANs 110, 114, 116 are shown separate from the network 107 in FIG. 1 to better illustrate the management of subscription profiles, the RANs 110, 114, 116 may equally be thought of as part of the network 107.

The coordinator device 103 and companion devices 106 may be a cell phone, a mobile phone, a smart phone, a personal digital assistant (PDA), an Internet of things (IoT) device, a wearable computer, a headset computer, a laptop computer, a tablet computer, a notebook computer, a medical monitoring device, a vehicle computer, etc. The coordinator device 103 and the companion devices 106 may be similar types of devices or different types of devices. In an embodiment, the coordinator device 103 may include more optimal features relative to the companion devices 106. For example, the coordinator device may include a UI 130, while one or more of the companion devices 106 may not necessarily include a UI 130. The coordinator device 103 may have a longer lasting power source, a more efficient or powerful CPU, a more optimal location with regard to signal strength from the cell sites 108, 115, and 117, etc.

A secure connection 111 may be a wired or wireless communication link established between the coordinator device 103 and the companion device 106. The secure connection 111 may be one in which the connection and the data transmitted through the connection are secured in a manner consistent with a relevant security protocol. For example, the secure connection 111 may be a Bluetooth® connection, a Near Field Communication (NFC) connection, a wireless local area network (WLAN) connection, a Wi-Fi connection, or a wide area network connection (using the cell sites 108, 115, 117). In an embodiment, the coordinator devices 103 and companion devices 106 may transmit data through the secured connection 111 using a low transmit power. For example, a Bluetooth® connection enables the devices 103 and 106 to transmit data using a low transmit power. In an embodiment, the secure connection 111 may also be a wired connection.

The coordinator device 103 and the companion devices 106 may each include one or more subscription profiles 133, a non-transitory memory 139, a transceiver 147, and a subscription management application 145. FIG. 1 shows the coordinator device 103 including the UI 130, but does not show the companion devices 106 as including the UI 130. However, it should be appreciated that one or more companion devices 106 may also include the UI 130. As should be appreciated, the coordinator device 103 and the companion device 106 may each include other components not shown in FIG. 1.

The transceiver 147 may be a radio modem on the device 103 and 106. The non-transitory memory 139 may be a memory configured to store cluster data 142, which refers to the determined and/or received location data and network data related to each of the coordinator device 103 and companion devices 106.

The subscription profiles 133 may include one or more SIM cards 134, which are integrated circuits running a card operating system intended to securely store the international mobile subscriber identity (IMSI) number and related network credentials/keys used to identify and authenticate subscribers on the device 103 and 106. The subscription profiles 133 may also include one or more eSIM profiles 136 (shown in FIG. 1 as "eSIM P 136"). Each of the eSIM profiles 136 is stored in the eUICC 135 of the device 103 and 106. In some cases, an eSIM profile 136 may be retrieved from an external data store 128 and downloaded at the device 103 and 106. An eSIM profile 136 may comprise any of a phone number (e.g., an IMSI number), a network identity (e.g., a public land mobile network (PLMN) identity), a country code, one or more network access keys, one or more network access credentials, one or more encryption keys, one or more preferred roaming lists (PRLs), one or more access point names (APNs), or one or more application service keys. The eSIM profile 136 may comprise one or more sets of executable instructions and/or applications. The eSIM profile 136 may comprise branding information and/or branding content. In some cases, the eUICC 135 may store a plurality of eSIM profiles 136 concurrently. In an embodiment, only one of the eSIM profiles 136 may be active at any one time.

Each of the subscription profiles 133 may be associated with a different subscription account, which corresponds to a different service provider. As mentioned above, each service provider or mobile network operator is associated with a different cell site 108, 115, 117 and corresponding RAN 110, 114, 116. In this way, each of the subscription profiles 133 may also be associated with a cell site 108, 115, 117 and corresponding RAN 110, 114, 116. The devices 103 and 106 may communicate with the cell sites 108, 115, 117, via the transceivers 147, to exchange information used to authenticate the subscriber behind the device 103 and 106. Once authenticated, the devices 103 and 106 may gain access to network 107 via one or more of the cell sites 108, 115, 117 and corresponding RANs 110, 114, 116.

The subscription management application 145 may be a set of instructions, or code, stored at, for example, the non-transitory memory 139. The subscription management application 145, when executed, may cause the coordinator device 103 and/or companion devices 106 to perform the steps shown in method 200 of FIG. 2, 300 of FIG. 3, 400 of FIG. 4, 500 of FIG. 5, and 600 of FIG. 6, as further described below.

Figure 2:
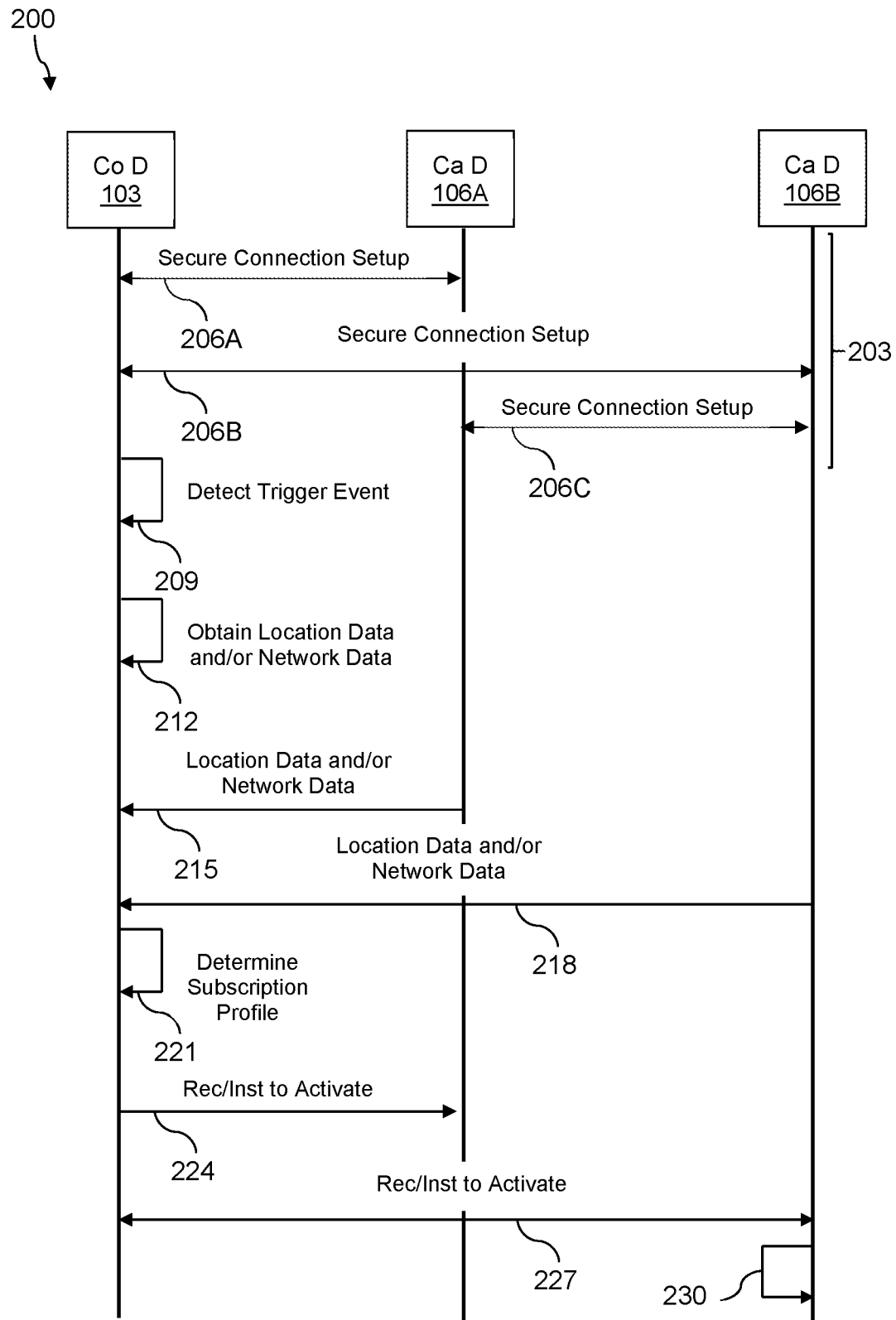
FIG. 2 is a message sequence diagram illustrating a first method of managing subscriptions across devices in a cluster of wireless devices according to an embodiment of the disclosure.

Turning now to FIG. 2, shown is a message sequence diagram illustrating a method 200 for automatically managing subscriptions across devices in the cluster 101 according to an embodiment of the disclosure. The method 200 is performed by a coordinator device 103 (shown in FIG. 2 as "Co D 103") and two companion devices 106A and 106B (shown in FIG. 2 as "Ca D 106A" and "Ca D 106B"). The coordinator device 103 and the two companion devices 106A-B are part of a single cluster 101 of wireless devices owned and operated by a user or entity, such that the devices 103 and 106A-B change locations together, or substantially together. In one case, multiple devices 103 and 106A-B may be carried on a person or in one or more luggage items of the person, such that the devices 103 and 106A-B are proximate to one another, or within at least a predefined distance from one another. For example, the predefined distance may be 200 feet, such that devices 103 and 106A-B are within 200 feet or less of each other to be considered part of the cluster 101. The devices 103 and 106A-B located proximate to one another may also change locations together as the person and luggage move to different physical locations.

The method 200 begins with a cluster registration process 203. In the cluster registration process 203 the coordinator device 103, companion device 106A, and companion device 106B may exchange messages with one another to create a trusted relationship between the coordinator device 103, companion device 106A, and companion device 106B, and thus create a secure connection 111 between the coordinator device 103, companion device 106A, and companion device 106B. In another embodiment, the companion device 106A and companion device 106B each exchange messages with the coordinator device 103, but not with each other, to create a trusted relationship and the secure connection 111 between the coordinator device 103 and each of the companion devices 106.

The cluster registration process 203 may include steps 206A, 206B, and 206C, which each involve the above-mentioned exchange of messages to establish the secure connection 111. For example, at step 206A, the coordinator device 103 and the companion device 106A may exchange messages to discover one another (e.g., when the devices are within a particular range of one another). The messages may be broadcasted in the form of broadcast packets that contain information about the device 103 and 106A sending the message. The information may indicate, for example, identification information of the sending device 103 or 106A, user information, SIM card 134 information, eSIM profile 136 information, etc. In an embodiment, the information in the broadcast packets indicate the owner/user of the sending device 103 or 106A, the installed SIM cards 134, and the eSIM profiles 136 present at the sending device 103 or 106A.

The other device 103 and 106A listens for broadcast packets and selects packets received from appropriate and compatible devices 103 and 106A based on the information carried in the broadcast packets, to establish the secure connection 111. As mentioned above, the secure connection 111 may be, for example, a Bluetooth® connection, a NFC connection, a WLAN connection, a Wi-Fi connection, or a wide area network connection (using the cell sites 108, 115, 117). The secure connection 111 may also be a wired connection. Similar messages may be exchanged between the coordinator device 103 and companion device 106B at step 206B. In an embodiment, similar messages may also be exchanged between the companion device 106A and the companion device 106B at step 206C, when the system 100 instructs all devices 103 and 106A-B in the cluster 101 to maintain cluster data 142 regarding all devices 103 and 106A-B in the cluster. In an embodiment, the user of the devices 103 and 106A-B may be prompted to approve the pairing and establishment of the secure connection 111.

In another embodiment, the user or entity owning and operating the coordinator device 103, companion device 106A, and companion device 106B may manually create the cluster 101 by providing input, via the UI 130, regarding the coordinator device 103, companion device 106A, and companion device 106B, and indicating that the devices 103, 106A, and 106B for the cluster 101. The devices 103, 106A, and 106B may store the data in the cluster data 142.

In this embodiment, the user or entity owning and operating may also provide, for example, via the UI 130, indicating a selection of the device 103 as the coordinator device 103, and/or a selection of the remaining devices 106A-B as the companion devices 160A-B. In another embodiment, the devices 103, 106A, and 106B may determine the coordinator device 103 based on the device information received during the cluster registration process 203. For example, the device information exchanged during the cluster registration process may indicate a power capacity, signal strength, CPU processing power, display size, or any other attribute of each device. The devices 103 may each be pre-configured to select the coordinator device 103 based on the device information having the optimal attribute (e.g., greatest power capacity, highest signal strength, greatest CPU processing power, largest display size, etc.). At this stage, the devices 103, 106A, and 106B have established the secure connection 111 and agreed upon the coordinator device 103 in the cluster 101.

At step 209, the subscription management application 145 detects that a trigger event has occurred, for example, to one or more of the coordinator device 103 or companion devices 106A-B, at an environment surrounding one or more of the coordinator device 103 or companion devices 106A-B, or to a network accessed by one or more of the coordinator device 103 or companion devices 106A-B. In an embodiment, the trigger event may occur when one or more of the coordinator device 103 or companion devices 106A-B changes locations to one that is served by a different cell site 108, 115, or 117. For example, a trigger event may occur when one or more of the coordinator device 103 or companion devices 106A-B changes locations from the standard home, served by cell site 117, to a vacation home, served by cell site 117. In an embodiment, the trigger event may occur when one or more of the coordinator device 103 or companion devices 106A-B detects a change in a network performance attribute of one of the RANs 110, 114, or 116. For example, the trigger event may occur when one or more of the coordinator device 103 or companion devices 106A-B detects that a network performance attribute (e.g., bandwidth, throughput, latency, jitter, error rate, signal strength, etc.) falls below or exceeds a threshold.

At step 212, the subscription management application 145 at the coordinator device 103 may obtain (e.g., determine) location data and/or network data in response to detecting the trigger event. The location data describes an absolute or relative location of the coordinator device 103, and for example, may be GPS coordinates of the coordinator device 103. The network data may describe a network characteristic of a RAN 110, 114, or 117 accessed by the coordinator device 103. For example, the network data may describe whether access to the RAN is available (e.g., seen RAN), a strength of connection to the RAN, and other network characteristics (e.g., bandwidth, throughput, latency, jitter, error rate, signal strength, etc.) of one or more seen RANs. The network data may also include QoS data related to the coordinator device 103. The network data may also indicate information regarding the available frequency bands at a location of the device 103, 106A, or 106B.

In method 200, the companion devices 106A-B may also obtain location data and network data associated with the respective companion device 106A-B. At step 215, the coordinator device 103 may receive the location data and/or the network data from the companion device 106A via the secure connection 111. Similarly, at step 218, the coordinator device 103 may receive the location data and/or network data from the companion device 106B via the secure connection 111. In an embodiment, the coordinator device 103 may store the obtained and received location data and/or network data as the cluster data 142 in the non-transitory memory 139.

In an embodiment, the network data obtained at step 215 and received at steps 215 and 218 may include QoS data describing subscribed-for network performance requirements for one or more applications running at the companion devices 106A-B. The coordinator device 103 may add the QoS data to the cluster data 142 stored in the non-transitory memory 139 after obtaining and receiving the QoS data.

At step 221, the subscription management application 145 may determine a subscription profile 133 (e.g., either a SIM card 134 or an eSIM profile 136) based on the location data and/or network data obtained at step 212 and the location data and/or network data received at steps 215 and 218. For example, suppose the location data of the coordinator device 103 and the location data received from the companion device 106B indicates a GPS coordinate that is not served by cell site 108. In addition, suppose the network data of the coordinator device 103 and the network data received from the companion device 106A indicate that there is no connection available to the RAN 110 corresponding to the cell site 108. In this case, subscription management application 145 may determine a subscription profile 133 based on the location data indicating the current GPS coordinate.

For example, the non-transitory memory 139 of the coordinator device 103 may store a look-up table based on a map that indicates a cell site 108, 115, and 117 and corresponding RAN 110, 114, and 116 served by different ranges of GPS locations. The look-up table may indicate a subscription profile 133 associated with each range of GPS coordinates. The subscription management application 145 may use the look-up table to determine the subscription profile 133 to activate at the coordinator device 103 and the companion devices 106A-B.

As another example, the subscription management application 145 may determine the RANs that are available (e.g., seen networks) for access by the coordinator device 103. The subscription management application 145 may scan for these networks and determine, for example, a network performance attribute of each of these seen networks. The subscription management application 145 may select the seen network, and thus the corresponding subscription profile 133, having the best network performance attributes.

In an embodiment, the subscription management application 145 may select a particular seen network based on a QoS subscribed for by the subscriber with regard to a particular device 103, 106A, or 106B. For example, supposing a subscriber may have subscribed for a higher transmission bandwidth (QoS data) only for companion device 106B, which may be, for example, a camera. In this case, the subscription profiles 133 of the subscriber, which may be across all devices 103 and 106A-B, indicate the QoS data for the companion device 106B. At step 221, the subscription management application 145 at the coordinator device 103 may obtain this QoS data for the companion device 106B, and determine that companion device 106B should activate a subscription profile 133 to access RAN 116 having a higher transmission bandwidth than RANs 110 and 114. Meanwhile, the subscription management application 145 at the coordinator device 103 may determine that the coordinator device 103 and the companion device 106A may access RAN 114. In this way, the coordinator device 103 may determine different subscription profiles 133 for the devices 103, 106A, and 106B in the cluster 101, to dynamically allocate devices 103 and 106A-B in the cluster 101 to different service providing networks.

In an embodiment, the coordinator device 103 may implement load sharing in the process of determining that different companion devices 106A-B should activate different subscription profiles 133 based on network performance attributes of different accessible networks. For example, different networks may have different network performance attributes, such as, for example, different jitters, different latency, different throughput rates, etc. The coordinator device 103 may obtain these network performance attributes from a node in each network, and determine that the different devices 103, 106A, and 106B should activate different subscription profiles 133. In this way, the coordinator device 103 may distribute wireless communication links to the devices 103, 106A, and 106B in the cluster between multiple networks based on device information and network performance attributes. In some embodiments, the pathways among the different networks and different devices 103, 106A, and 106B may be amalgamated together to create a link. In this embodiment, a proxy server may be used to connect the pathways among the different networks, such that traffic can be forwarded through the amalgamated link between the devices 103, 106A, and 106B.

At this stage, the subscription management application 145 at the coordinator device 103 activates the subscription profile 133 determined either generally for all the devices 103 and 106A-B or specifically for the coordinator device 103. In an embodiment, an indication of switching to the subscription profile 133 may be displayed on the UI 130 of the coordinator device 103. In an embodiment, the coordinator device 103 may only activate the subscription profile 133 when the user of the coordinator device 103 selects an input on the UI 130 indicating authorization to activate the subscription profile 133. In some cases, steps 224, 227, and 230 are only performed when the coordinator device 103 activates the subscription profile 133.

In an embodiment, the cluster 101 also includes one or more peer devices that have established a secure connection with the coordinator device 103 and one or more of the companion devices 106A-B. The coordinator device 103 may transmit the location data and/or network data obtained at steps 212, 215, and 218 to the peer device via the secure connection. In this embodiment, the peer device may perform step 221 to determine the subscription profile 133 based on the information received from the coordinator device 103 in a manner similar to that described above. The peer device may transmit the determine subscription profile 133 to the coordinator device 103 via the secure connection.

At step 224, the subscription management application 145 at the coordinator device 103 transmits, via the secure connection 111 to the companion device 106A, a message including a recommendation or instruction to activate the subscription profile 133 determined at step 221. In an embodiment, the companion device 106A may receive the recommendation in the message and either activate the determined subscription profile 133 or ignore the recommendation. In another embodiment, the instruction in the message triggers the companion device 106A to activate the determined subscription profile 133. As should be appreciated, activating a subscription profile 133 may involve deactivating a previous subscription profile 133. At step 227, the subscription management application 145 transmits, via the secure connection 111 to the companion device 106B, a message including a recommendation or instruction to activate the subscription profile 133 determined at step 221. The companion device 106б processes the message similar to that described above. In response to executing the received instruction, the companion device 106B may change the SIM or eUICC to activate the subscription profile 133.

In some cases, the companion device 106B may not have (e.g., store at the eUICC 135) the subscription profile 133 determined at step 221. In this case, the companion device 106B may need to download and install the subscription profile 133 from either the coordinator device 103 or from an external data store 137. At step 230, the companion device 106B may determine that the subscription profile 133 is not present at the companion device 106. In an embodiment, the companion device 106B may send a message to the coordinator device 103 requesting an address or link to download the subscription profile 133. In such a case, the coordinator device 103 may respond with a second message including the link or address to a location at which the subscription profile may be downloaded at the companion device. The second message may include, for example, a token used to authenticate the companion device 106B when receiving the subscription profile 133. In another embodiment, the coordinator device 103 may have prior knowledge of the subscription profiles 133 present at each of the companion devices 106A-B. In this case, prior to step 227, the coordinator device 103 may already be aware that the companion device 106B does not have the subscription profile 133 determined at step 221. In this case, the coordinator device 103 transmits, in the message at step 227, the link or address to a location at which the subscription profile may be downloaded at the companion device. The message may include the token.

The address at which the subscription profile 133 may be downloaded from may be a cache at the coordinator device 103 or a location in an external data store 128. The companion device 106B may retrieve or download the subscription profile 133 using the token. The companion device 106B may then install the subscription profile 133 and enter the credentials, if needed, to begin activating the subscription profile 133.

As should be appreciated, while only two companion devices 106A-B are described in FIG. 2, the method 200 is readily extendable to any number of companion devices 106A-B, for example to a single companion device 106 or to three or more companion devices 106.

Figure 3:
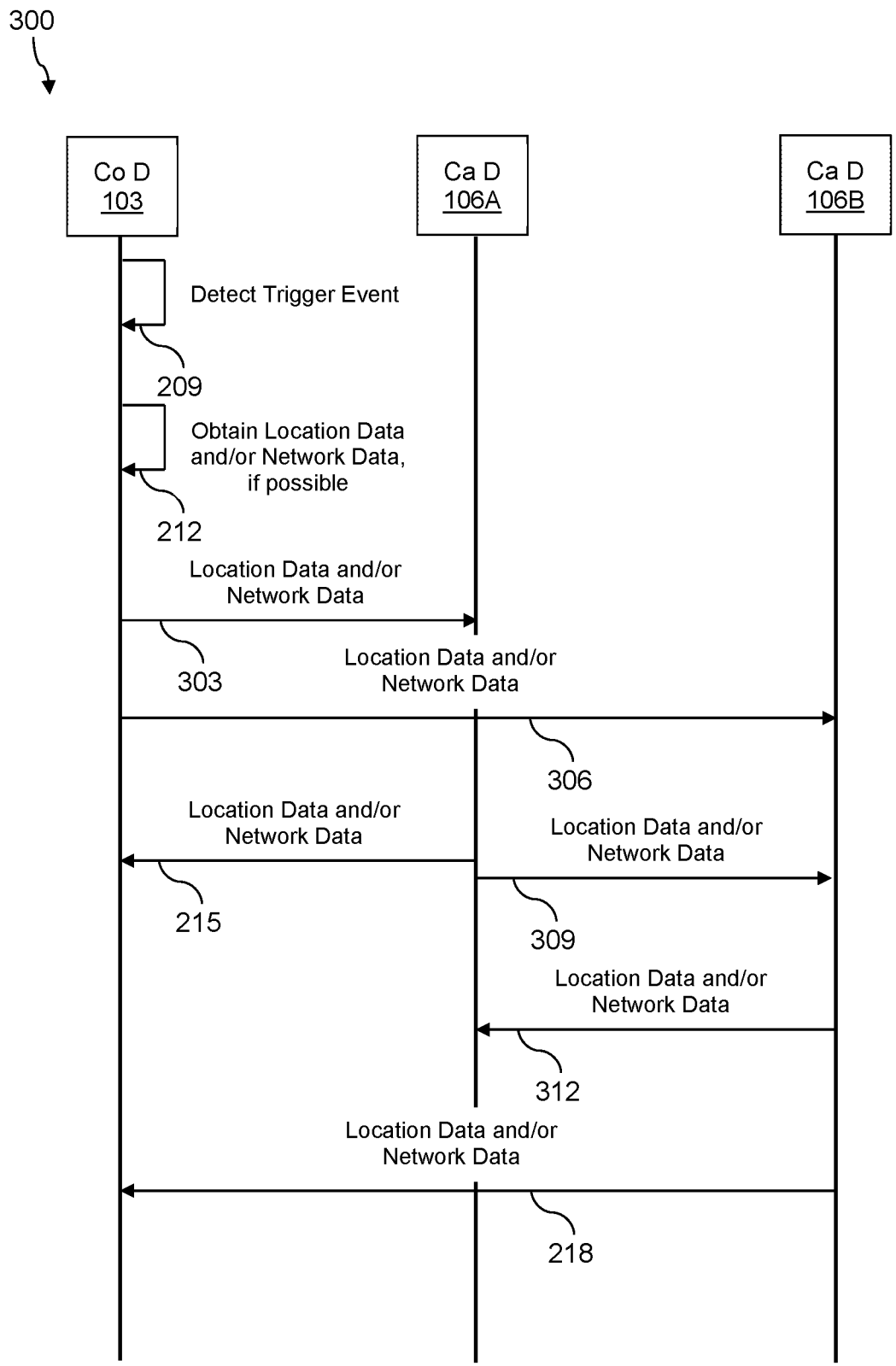
FIG. 3 is a message sequence diagram illustrating a second method of managing subscriptions across devices in a cluster of wireless devices according to an embodiment of the disclosure.

Turning now to FIG. 3, shown is a message sequence diagram illustrating a method 300 for automatically managing subscriptions across devices in the cluster 101 according to an embodiment of the disclosure. The method 300 is performed by the coordinator device 103 (shown in FIG. 3 as "Co D 103") and the two companion devices 106A and 106B (shown in FIG. 3 as "Ca D 106A" and "Ca D 106B").

The method 300 is similar to method 200 shown in FIG. 2, except that instead of only aggregating the location data and/or network data at the coordinator device 103, as shown in method 200, method 300 involves sharing the location data and/or network data obtained by all devices 103 and 106A-B with all the devices 103 and 106A-B in the cluster 101. The method 300 includes steps 209 and 212, as described above. In addition, at step 303, the coordinator device 103 transmits the location data and/or network data, obtained by the coordinator device 103, to the companion device 106A via the secure connection 111. Similarly, at step 306, the coordinator device 103 transmits the location data and/or network data, obtained by the coordinator device 103, to the companion device 106B via the secure connection 111.

The method 300 includes step 215 in which the companion device 106A transmits the location data and/or network data, obtained by the companion device 106A, to the coordinator device 103. In addition, at step 309, the companion device 106A transmits the location data and/or network data, obtained by the companion device 106A, to the companion device 106B.

The method 300 includes step 218 in which the companion device 106B transmits the location data and/or network data, obtained by the companion device 106B, to the coordinator device 103. In addition, at step 312, the companion device 106B transmits the location data and/or network data, obtained by the companion device 106B, to the companion device 106A.

The embodiment shown in method 300 may be beneficial in situations in which the coordinator device 103 may not be able to operate at full capacity as expected. A companion device 106A-B may fulfill some of the steps that might otherwise be performed by the coordinator device 103. For example, the coordinator device 103 may have turned off the GPS receiver to conserve power, and the coordinator device 103 may communicate with a companion device 106A that is also GPS enabled to turn on the GPS receiver at the companion device 106A. In this way, the companion device 106A may determine updated location data using the GPS receiver at the companion device 106A upon detecting a trigger event and transmit the updated location data to the coordinator device 103 enabled in a power saving mode. The coordinator device 103 may use the updated location data received from the companion device 106A to determine the subscription profile 133.

FIG. 3 does not show method 300 as including the cluster registration process 203 and steps 221, 224, 227, and 230 of method 200. However, it should be appreciated that method 300 may include the cluster registration process 203 and steps 221, 224, 227, and 230 of method 200. As should be appreciated, while only two companion devices 106A-B are described in FIG. 3, the method 300 is readily extendable to any number of companion devices 106A-B, for example to a single companion device 106 or to three or more companion devices 106.

Figure 4:
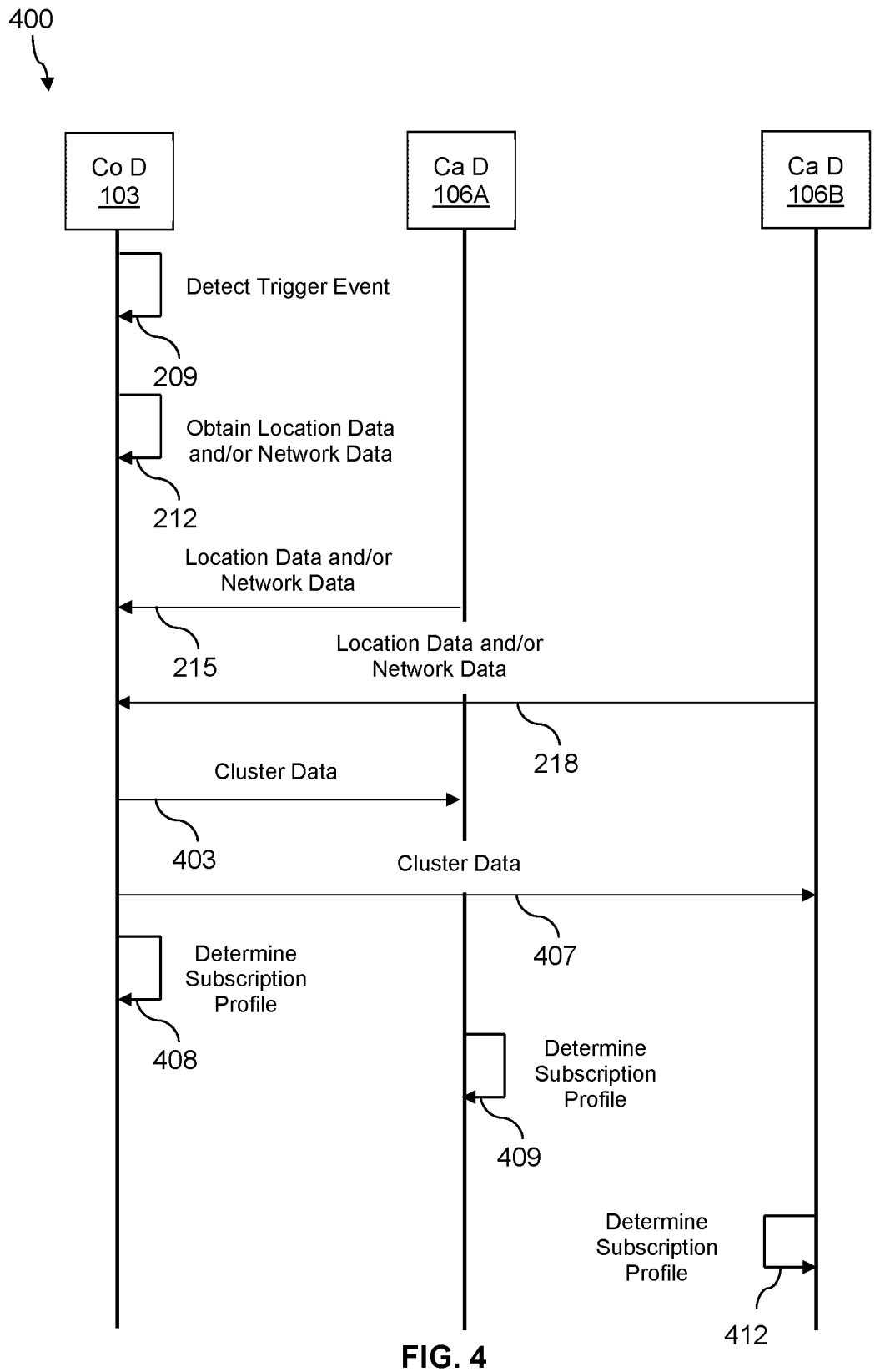
FIG. 4 is a message sequence diagram illustrating a third method of managing subscriptions across devices in a cluster of wireless devices according to an embodiment of the disclosure.

Turning now to FIG. 4, shown is a message sequence diagram illustrating a method 400 for automatically managing subscriptions across in the cluster 101 according to an embodiment of the disclosure. The method 400 is performed by the coordinator device 103 (shown in FIG. 4 as "Co D 103") and the two companion devices 106A and 106B (shown in FIG. 4 as "Ca D 106A" and "Ca D 106B").

The method 400 is similar to method 200 shown in FIG. 2, except that instead of the coordinator device 103 determining the subscription profile 133 for the companion devices 106A-B, as shown in method 200, method 400 involves each of the devices 103 and 106A-B separately determining a respective subscription profile 133 for itself. The method 400 includes the cluster registration process 203 (although not shown), steps 209, 212, 215, and 218, as described above. After these steps, the coordinator device 103 may store the obtained and received location data and/or network data (including QoS data) as the cluster data 142. At step 403, the coordinator device 103 may transmit the cluster data 142, comprising all the obtained and received location data and network data, to the companion device 106A via the secure connection 111. At step 407, the coordinator device 103 may similarly transmit the cluster data 142 to the companion device 106B via the secure connection 111.

The method 400 includes step 408 that is similar to step 221 of method 200, which as described above may involve the subscription management application 145 of the coordinator device 103 determining a subscription profile 133 to activate at the coordinator device 103 based on the cluster data 142. Similarly, companion device 106A may determine, at step 409, a subscription profile 133 to activate at the companion device 106A based on the cluster data 142. For example, instead of relying on the coordinator device 103, the companion device 106A may be in a better position to periodically analyze the available frequency bands at a location of the companion device 106. The subscription profile 133 may be determined by the companion device 106A based on the available frequency bands at the location of the companion device 106A. In addition, when the companion device 106A is specifically subscribed for as requiring access to a network meeting a QoS requirement, the companion device 106A may alone make the determination of which subscription profile 133 to activate based on the network associated with the subscription profile 133.

Next, companion device 106B may determine, at step 412, a subscription profile 133 to activate at the companion device 106A based on the cluster data 142. In an embodiment, companion devices 106A and 106B may perform step 230 to download and install subscription profiles 133 that are not already present at the companion device 106A-B. As should be appreciated, while only two companion devices 106A-B are described in FIG. 4, the method 400 is readily extendable to any number of companion devices 106A-B, for example to a single companion device 106 or to three or more companion devices 106.

Figure 5:
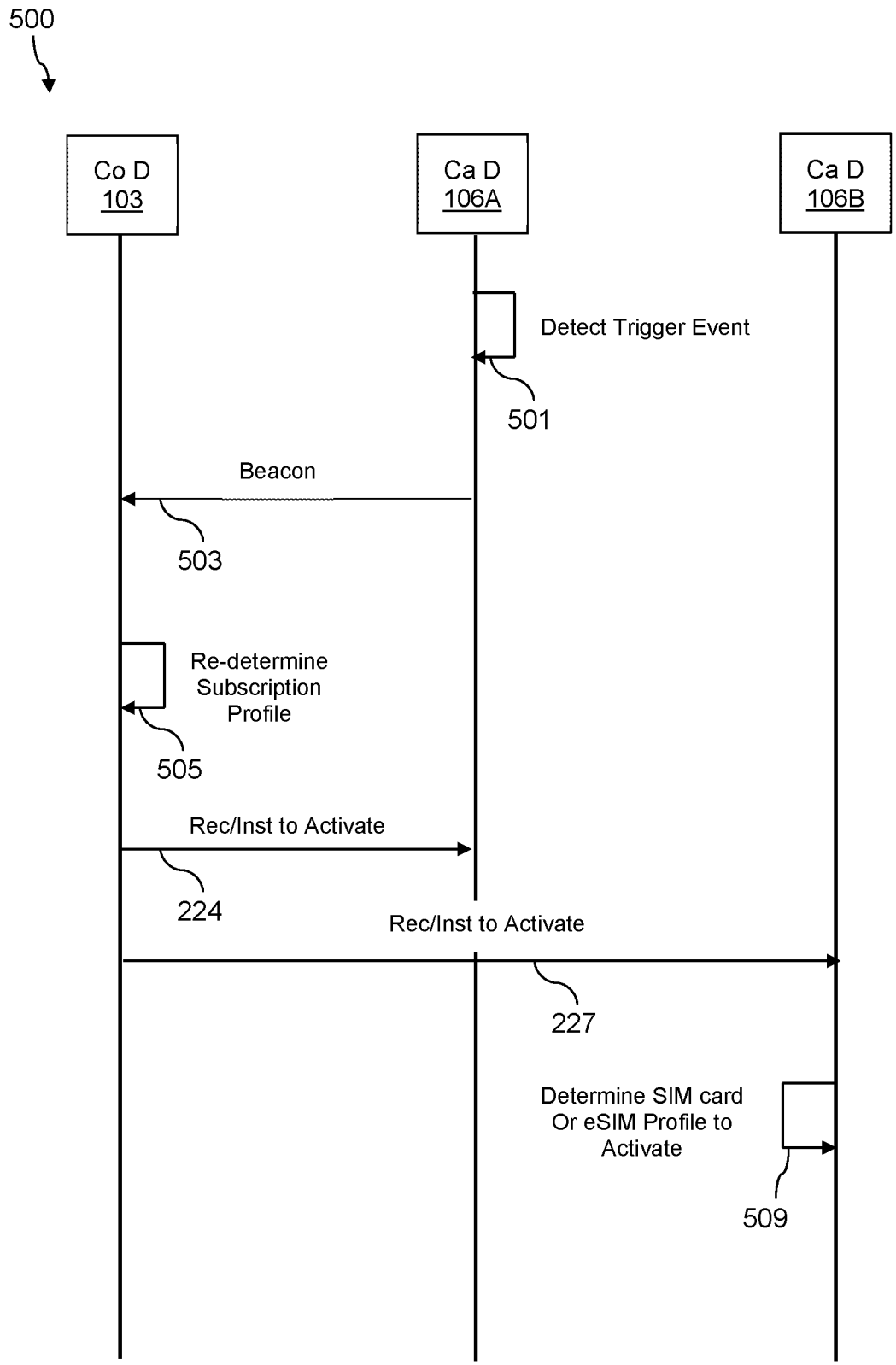
FIG. 5 is a message sequence diagram illustrating a fourth method of managing subscriptions across devices in a cluster of wireless devices according to an embodiment of the disclosure.

Turning now to FIG. 5, shown is a message sequence diagram illustrating a method 500 for automatically managing subscriptions across the cluster 101 according to an embodiment of the disclosure. The method 500 is performed by the coordinator device 103 (shown in FIG. 2 as "Co D 103") and the two companion devices 106A and 106B (shown in FIG. 2 as "Ca D 106A" and "Ca D 106B").

Subsequent to activating a subscription profile 133 across one or more of the devices 103 and 106A-B in the cluster 101, one of the companion devices 106A-B may prompt the coordinator device 103 to re-determine a subscription profile 133 based on a trigger event. At step 501, the subscription management application 145 of the companion device 106A detects the trigger event. In this case, the trigger event may occur when the companion device 106A-B detects that network coverage (e.g., access to the RAN or WAN coverage) is lost or has become marginal, to the extent that the companion device 106A-B has limited or no access to the Internet.

After detecting the trigger event, at step 503, the companion device 106A may transmit a prompt to the coordinator device 103 using a frame that uses low transmit power, such as a Bluetooth® beacon frame, via the secure connection 111. At step 505, the reception of the beacon frame triggers the subscription management application 145 at the coordinator device 103 to re-determine a subscription profile 133 for the companion device 106 and/or the coordinator device 103 and companion device 106B (based on QoS requirements and a network performance). The re-determination of the subscription profile 133 may be performed in a manner similar to that described above with regard to step 221 of method 200. However, at step 505, the subscription management application 145 should exclude the currently activated subscription profile 133 from the determination of new subscription profile 133. As described herein, the subscription management application 145 should determine the new subscription profile 133 based on the cluster data 142 including aggregated location data and network data. In an embodiment, the coordinator device 103 may activate the new subscription profile 133.

At steps 224 and 227, the coordinator device 103 may send a message including a recommendation or instruction for the companion devices 106A and 106B, respectively, to activate the new subscription profile 133. The companion device 106A may activate the new subscription profile 133, for example by executing the instruction on a processor of the companion devices 106A. However, the companion device 106B may make a determination, at step 509, as to whether to activate the new subscription profile 133, and may activate the new subscription profile 133 accordingly, for example by executing the instruction on a processor of the companion devices 106B. As should be appreciated, while only two companion devices 106A-B are described in FIG. 5, the method 500 is readily extendable to any number of companion devices 106A-B, for example to a single companion device 106 or to three or more companion devices 106

Figure 6:
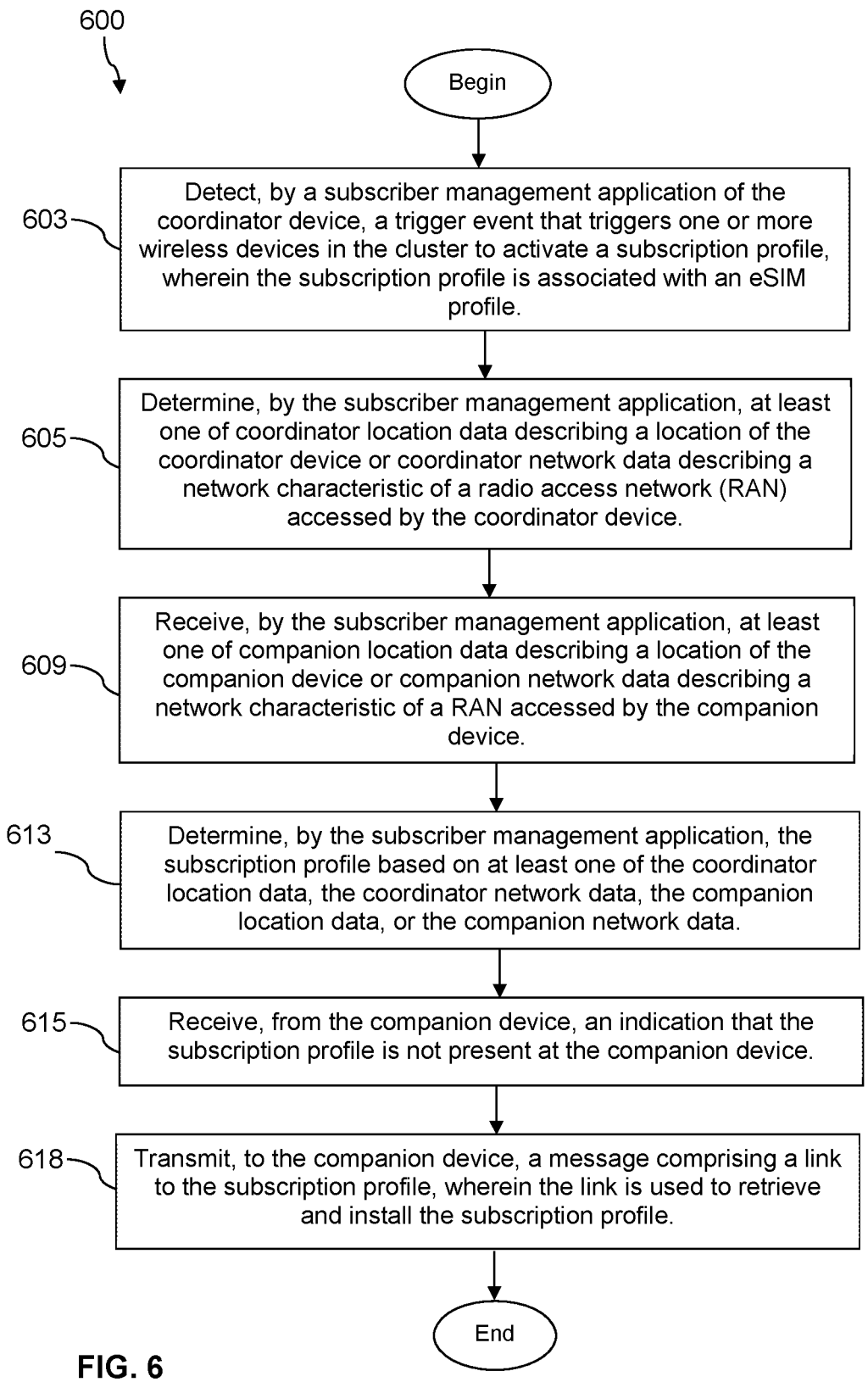
FIG. 6 is a flowchart illustrating a method of managing subscriptions across devices in a cluster of wireless devices according to an embodiment of the disclosure.

FIG. 6 is a flowchart illustrating a method 600 for automatically managing subscriptions across in the cluster 101 according to an embodiment of the disclosure. The method 500 may be performed by the coordinator device 103.

At step 603, the method 600 includes detecting, by the subscription management application 145, a trigger event that triggers one or more wireless devices 103 and 106A-B in the cluster 101 to activate a subscription profile 133. In an embodiment, the subscription profile is associated with an eSIM profile 136.

At step 605, the method 600 includes determining, by the subscription management application 145, at least one of coordinator location data describing a location of the coordinator device 103 or coordinator network data describing a network characteristic of a RAN accessed by the coordinator device 103. In an embodiment, the network data may also include QoS data of the coordinator device 103. For example, the QoS data may indicate that user data associated with the coordinator device 103 should be transmitted through a network with a lower latency and higher throughput due to the prioritized nature of the data being transmitted. In an embodiment, the QoS data may comprise a maximum jitter QoS value, a maximum latency QoS value, a minimum data rate throughput QoS value, a minimum frequency bandwidth or number of frequency channels QoS value, and/or a minimum channel quality indication (CQI) QoS value.

At step 609, the method 600 includes receiving, by the subscription management application 145, at least one of companion location data describing a location of the companion device 106A-B or companion network data describing a network characteristic of a RAN accessed by the companion device 106A-B. In an embodiment, the network data may also include QoS data of the companion device 106A-B. For example, the QoS data may indicate that user data associated with a companion device 160A-B should be transmitted through a network or wireless channel(s) with a higher bandwidth.

At step 613, the method 600 includes determining, by the subscription management application 145, the subscription profile 133 based on at least one of the coordinator location data, the coordinator network data, the companion location data, or the companion network data. In an embodiment, the coordinator location data, the coordinator network data, the companion location data, or the companion network data may be stored in the cluster data 142 at the non-transitory memory 139.

At step 615, the method 300 includes receiving, from the companion device 106A-B, an indication that the subscription profile 133 is not present at the companion device 106A-B. At step 618, the method 300 includes transmitting, to the companion device 106A-B, a message comprising a link to the subscription profile 133. In an embodiment, the link is used to retrieve and install the subscription profile 133.

Figure 7:
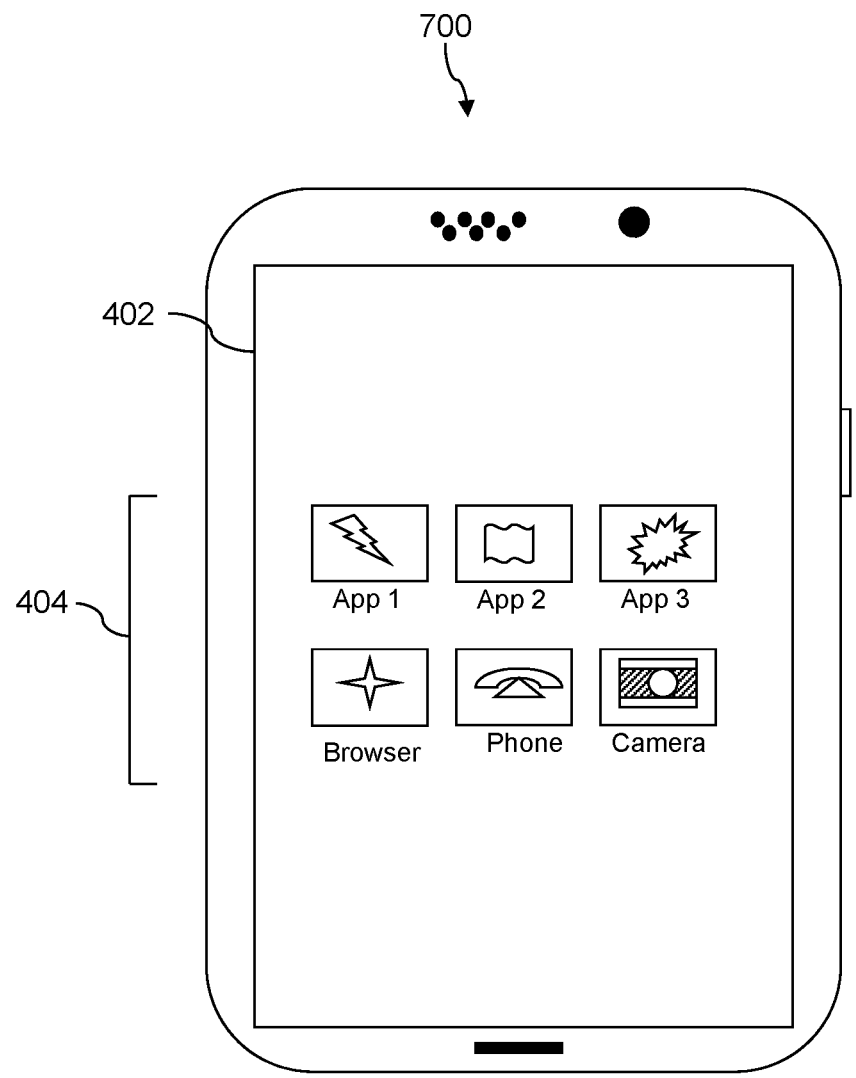
FIG. 7 is an illustration of a wireless communication device according to an embodiment of the disclosure.

FIG. 7 depicts the user equipment (UE) 700, which is operable for implementing aspects of the present disclosure, but the present disclosure should not be limited to these implementations. Though illustrated as a mobile phone, the UE 700 may take various forms including a wireless handset, a pager, a personal digital assistant (PDA), a gaming device, or a media player. The UE 700 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 700, a user may be able to download and install additional applications on the UE 700, and an icon associated with such downloaded and installed applications may be added to the touch screen display 402 or to an alternative screen. The UE 700 may have other components such as electro-mechanical switches, speakers, camera lenses, microphones, input and/or output connectors, and other components as are well known in the art. The UE 700 may present options for the user to select, controls for the user to actuate, and/or cursors or other indicators for the user to direct. The UE 700 may further accept data entry from the user, including numbers to dial or various parameter values for configuring the operation of the handset. The UE 700 may further execute one or more software or firmware applications in response to user commands. These applications may configure the UE 700 to perform various customized functions in response to user interaction. Additionally, the UE 700 may be programmed and/or configured over-the-air, for example from a wireless base station, a wireless access point, or a peer UE 700. The UE 700 may execute a web browser application which enables the touch screen display 402 to show a web page. The web page may be obtained via wireless communications with a base transceiver station, a wireless network access node, a peer UE 700 or any other wireless communication network or system.

Figure 8:
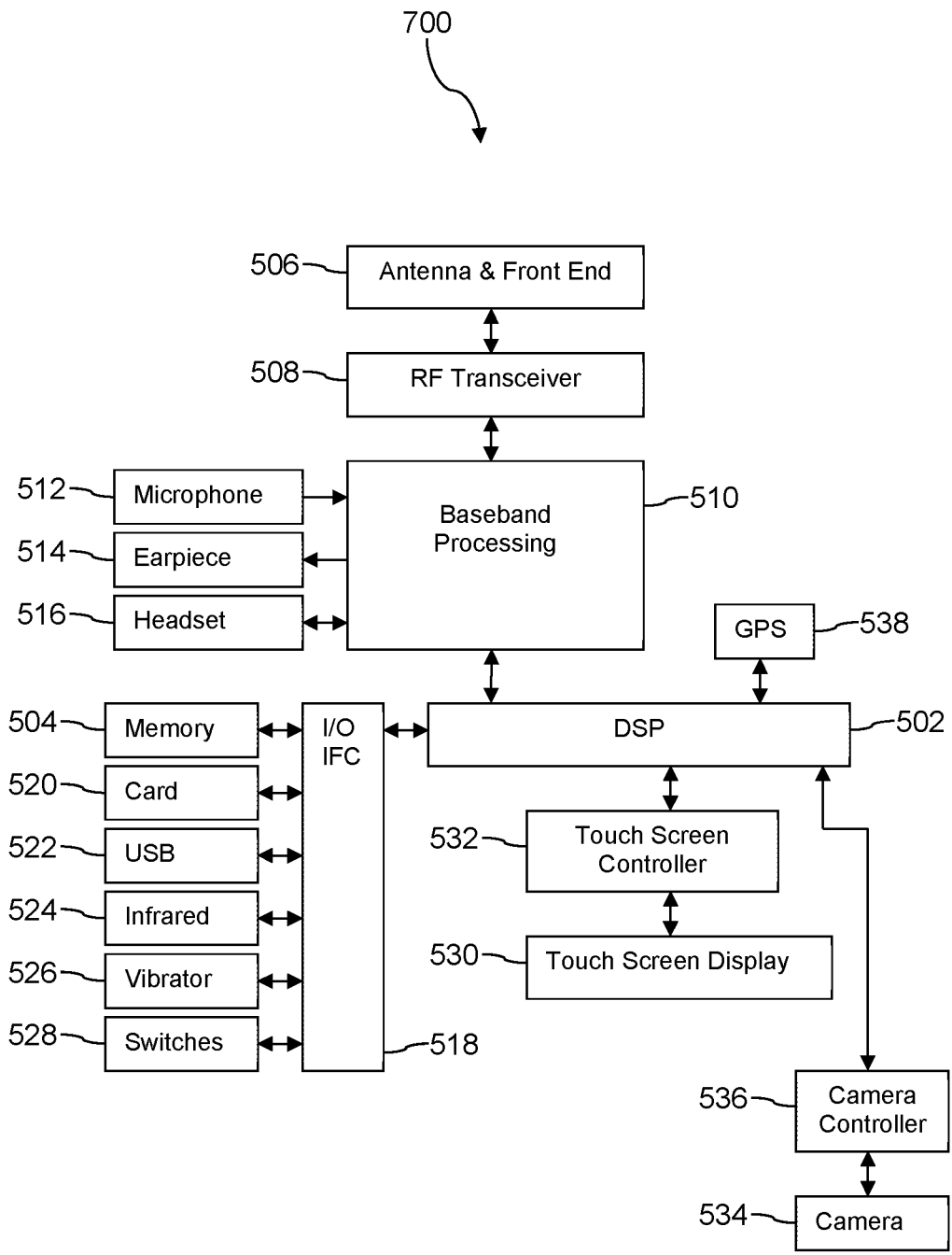
FIG. 8 is a block diagram or a hardware architecture of a wireless communication device according to an embodiment of the disclosure.

FIG. 8 shows a block diagram of the UE 700. In an embodiment, UE 700 may be implemented as the coordinator device 103 and/or the companion devices 106A-B. While a variety of known components of handsets are depicted, in an embodiment a subset of the listed components and/or additional components not listed may be included in the UE 700. The UE 700 includes a digital signal processor (DSP) 502 and a memory 504. As shown, the UE 700 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 700 may include another kind of display that does not provide a touch sensitive screen. In an embodiment, the UE 700 may include both the touch screen display 530 and additional display component that does not provide a touch sensitive screen. In an embodiment, the DSP 502 may communicate directly with the memory 504 without passing through the input/output interface 518. Additionally, in an embodiment, the UE 700 may comprise other peripheral devices that provide other functionality.

The DSP 502 or some other form of controller or central processing unit operates to control the various components of the UE 700 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 700 to function as a peripheral device to exchange information with a personal computer or other computer system. The infrared port 524 and other optional ports such as a Bluetooth® interface or an IEEE 802.11 compliant wireless interface may enable the UE 700 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 700 may comprise a radio frequency identify (RFID) reader and/or writer device.

The switches 528 may couple to the DSP 502 via the input/output interface 518 to provide one mechanism for the user to provide input to the UE 700. Alternatively, one or more of the switches 528 may be coupled to a motherboard of the UE 700 and/or to components of the UE 700 via a different path (e.g., not via the input/output interface 518), for example coupled to a power control circuit (power button) of the UE 700. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 700 to determine its position.

Figure 9A:
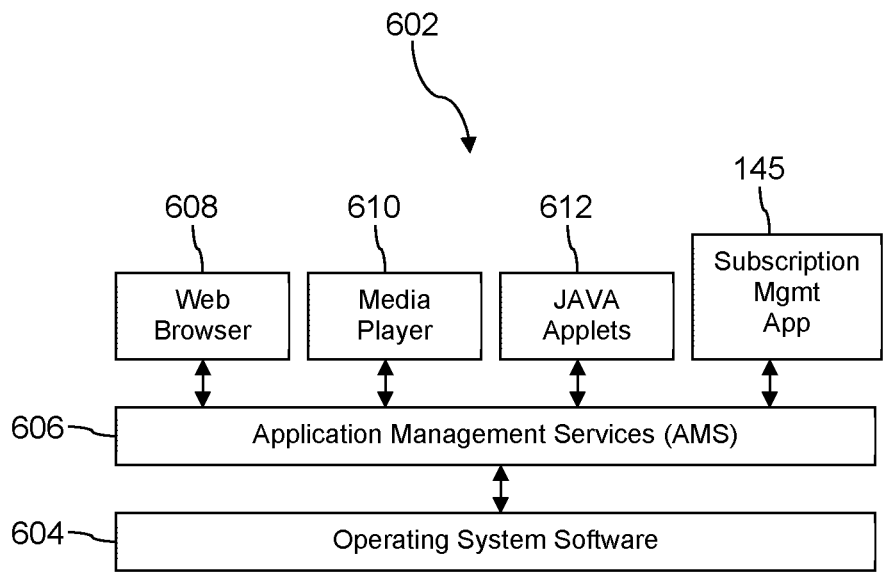
FIG. 9A is a block diagram of a software architecture of a wireless communication device according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 700. Also shown in FIG. 9A are a web browser application 608, a media player application 610, JAVA applets 612, and the subscription management application 145 described above with reference to FIG. 1. The web browser application 608 may be executed by the UE 700 to browse content and/or the Internet, for example when the UE 700 is coupled to a network via a wireless link. The web browser application 608 may permit a user to enter information into forms and select links to retrieve and view web pages. The media player application 610 may be executed by the UE 700 to play audio or audiovisual media. The JAVA applets 612 may be executed by the UE 700 to provide a variety of functionality including games, utilities, and other functionality.

Figure 9B:
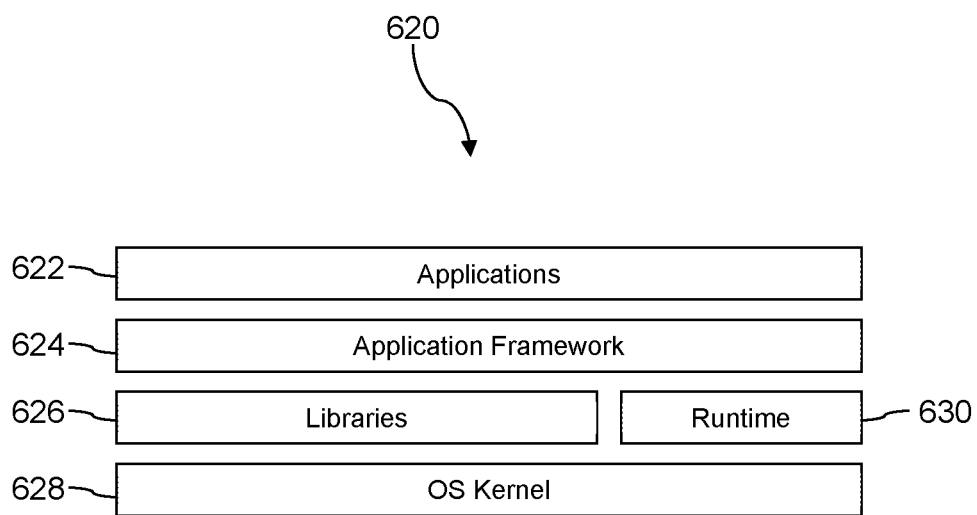
FIG. 9B is a block diagram of another software architecture of a wireless communication device according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
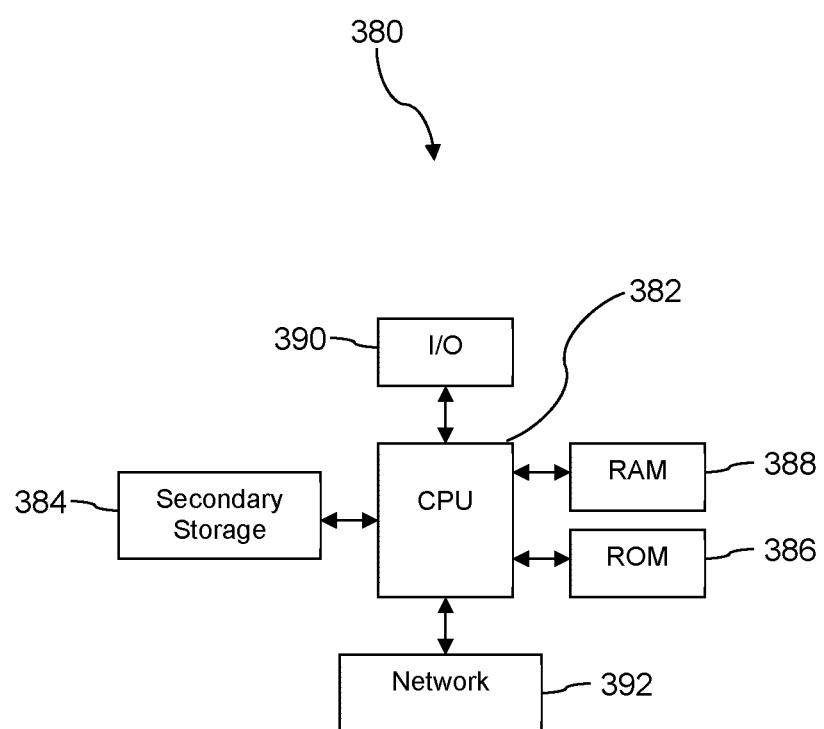
FIG. 10 is a block diagram of a computer system according to an embodiment of the disclosure.

FIG. 10 illustrates a computer system 380 suitable for implementing one or more embodiments disclosed herein. In an embodiment, the coordinator device 103 and/or the companion devices 106A-B may be implemented as a computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented by a cluster of wireless devices comprising a coordinator device and a companion device communicatively coupled to the coordinator device, wherein the method comprises:

detecting, by a first subscription management application of the coordinator device, a trigger event that triggers one or more wireless devices in the cluster to activate a subscription profile, wherein the subscription profile is associated with a Subscriber Identity Module (SIM) card or an electronic Subscriber Identity Module (eSIM) profile;

transmitting, by the first subscription management application, at least one of coordinator location data describing a location of the coordinator device or coordinator network data describing a network performance characteristic of a radio access network (RAN) accessed by the coordinator device;

receiving, by the first subscription management application, at least one of companion location data describing a location of the companion device or companion network data describing a network performance characteristic of a RAN accessed by the companion device;

activating, by the first subscription management application, the subscription profile at the coordinator device;

receiving, by a second subscription management application of the companion device, at least one of the coordinator location data or the coordinator network data;

transmitting, by the second subscription management application, at least one of the companion location data or the companion network data;

activating, by the second subscription management application, the subscription profile at the companion device;

transmitting, by the second subscription management application, quality of service data describing network requirements for running an application at a second companion device; and determining, by the second subscription management application, the subscription profile based on the quality of service data and at least one of the coordinator location data, the coordinator network data, the companion location data, or the companion network data.

2. The method of claim 1, wherein the coordinator device and the one or more companion devices are coupled together via a wired connection or a wireless connection, wherein the wireless connection is a Near Field Communication (NFC) connection, a Bluetooth® connection, a wireless local area network (WLAN) connection, or a wide area network (WAN) connection.

3. The method of claim 1, wherein the coordinator device further comprises an embedded universal integrated circuit card (eUICC) configured to store one or more eSIM profiles, wherein each of the eSIM profiles are associated with network access credentials, wireless communication data, and subscriber data, and wherein the subscription profile is one of the eSIM profiles.

4. The method of claim 1, wherein prior to the subscription profile being activated, the method further comprises:
transmitting, by the second subscription management application, a token to the coordinator device; and
receiving, by the second subscription management application the subscription profile from the coordinator device in response to the token.

5. A method for managing subscriptions across a cluster of wireless devices comprising a coordinator device and one or more companion devices, wherein the method comprises:
detecting, by a subscription management application of the coordinator device, a trigger event that triggers one or more wireless devices in the cluster to activate a subscription profile, wherein the subscription profile is associated with an electronic Subscriber Identity Module (eSIM) profile;
determining, by the subscription management application, at least one of coordinator location data describing a location of the coordinator device or coordinator network data describing a network performance characteristic of a radio access network (RAN) accessed by the coordinator device;
receiving, by the subscription management application, at least one of companion location data describing a location of a companion device of the one or more companion devices or companion network data describing a network performance characteristic of a RAN accessed by the companion device, wherein the trigger event occurs when the coordinator device or a companion device of the one or more companion devices changes a location to a different cell site or detects a change in a network performance attribute of the RAN accessed by the companion device;
determining, by the subscription management application, the subscription profile based on at least one of the coordinator location data, the coordinator network data, the companion location data, or the companion network data;
receiving, from the companion device, an indication that the subscription profile is not present at the companion device; and
transmitting, to the companion device, a message comprising a link to the subscription profile, wherein the link is used to retrieve and install the subscription profile.

6. The method of claim 5, wherein the link indicates an address in a non-transitory memory of the coordinator device.

7. The method of claim 5, wherein the link indicates an address in an external data store.

8. The method of claim 5, wherein the message further comprises a token used to authenticate the companion device.

9. The method of claim 5, further comprising activating, by the subscription management application, the subscription profile at the coordinator device.

10. A system, comprising:
a cluster of wireless devices, comprising:
a coordinator device; and
one or more companion devices coupled to the coordinator device, wherein the coordinator device comprises:
one or more non-transitory memories;
one or more processors coupled to the one or more non-transitory memories;
a subscription management application stored in one of the one or more non-transitory memories that, when executed by one of the one or more processors, cause the one of the one or more processors to be configured to:
detect a trigger event that triggers one or more wireless devices in the cluster to activate a subscription profile, wherein the subscription profile is associated with a Subscriber Identity Module (SIM) card or an electronic Subscriber Identity Module (eSIM) profile, wherein the trigger event occurs when at least one of the coordinator device or the companion device changes a location to one served by a different cell site or detects a change in a network performance attribute of a radio access network (RAN);
determine at least one of coordinator location data describing a location of the coordinator device or coordinator network data describing a network characteristic of a RAN accessed by the coordinator device;
receive at least one of companion location data describing a location of the companion device or companion network data describing a network characteristic of a RAN accessed by the companion device;
determine the subscription profile to activate at the companion device based on at least one of the coordinator location data, the coordinator network data, the companion location data, or the companion network data; and
transmit, to the companion device, a message comprising a recommendation to activate the subscription profile at the companion device.

11. The system of claim 10, wherein the coordinator device further comprises an embedded universal integrated circuit card (eUICC) configured to store one or more eSIM profiles, wherein each of the eSIM profiles are associated with network access credentials, wireless communication data, and subscriber data, and wherein the subscription profile is one of the eSIM profiles.

12. The system of claim 11, wherein the coordinator device further comprises the SIM card, wherein subscription profile is one of the SIM card or one of the eSIM profiles.

13. The system of claim 10, wherein the subscription management application, when executed by the one of the one or more processors, further causes the one of the one or more processors to be configured to:
receive quality of service data describing network requirements for running an application at a second companion device;
determine a second subscription profile to activate at the second companion device based on the quality of service data and the coordinator location data or coordinator network data; and transmit a second message comprising a second recommendation to activate the second subscription profile at the second companion device, wherein the subscription profile and the second subscription profiles are different eSIM profiles.

14. The system of claim 10, wherein the recommendation to activate the subscription profile at the companion device comprises an address from which the subscription profile is to be downloaded by the companion device, wherein the location is either in the non-transitory memory of the coordinator device or in a data store accessible to the companion device.

15. The system of claim 10, wherein the non-transitory memory is further configured to store a look-up table comprising mappings between geographical locations and respective subscription profiles.

16. The system of claim 10, wherein the recommendation to activate the subscription profile at the companion device is an instruction to change an activated subscription profile at the companion device, wherein the companion device is configured to deactivate the activated subscription profile and activate the subscription profile in response to executing the instruction.

17. The system of claim 16, wherein activating the subscription profile by the companion device in response to executing the instruction comprises changing an eUICC of the companion device by activating a different eSIM profile in the eUICC of the companion device.

18. The system of claim 10, wherein the non-transitory memory is further configured to store at least one of the coordinator location data, the coordinator network data, the companion location data, or the companion network data as cluster data describing an environment of the wireless devices in the cluster, and wherein the subscription management application, when executed by the one of the one or more processors, further causes the one of the one or more processors to be configured to transmit the cluster data to the companion devices in the cluster.

\* \* \* \* \*